Oct. 18, 1960  D. J. VOSS ET AL  2,956,916
HELMET SHELL AND METHOD OF MAKING IT
Filed July 1, 1958
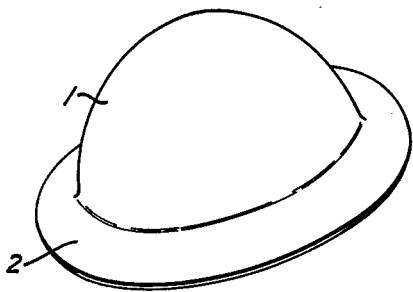
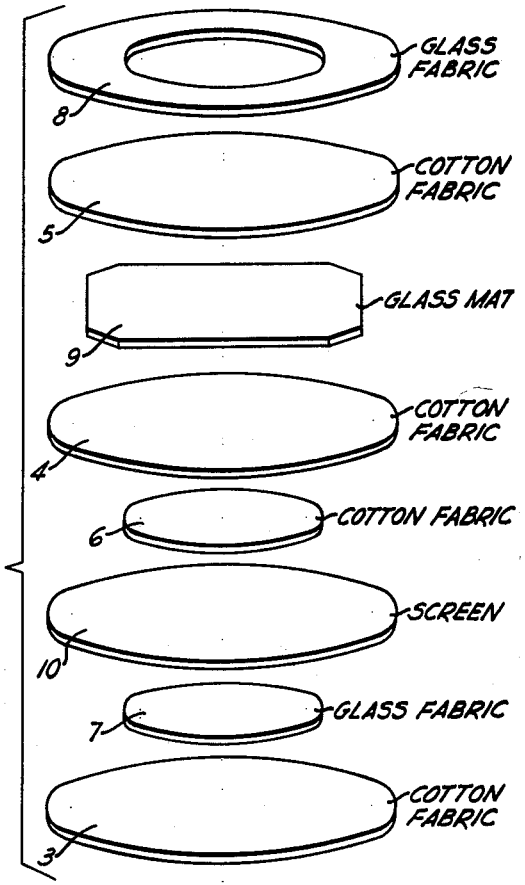
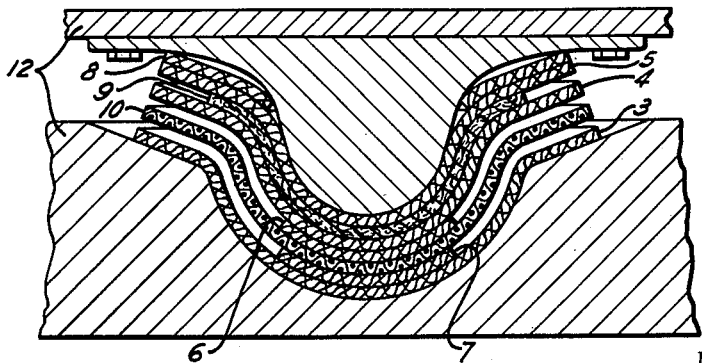
INVENTOR.
DONALD J. VOSS and
MICHAEL THEODORE
BY
Brown, Critchlow, Flick & Peckham
Their Attorneys 2,956,916
HELMET SHELL AND METHOD OF MAKING IT Donald J. Voss and Michael Theodore, Pittsburgh, Pa., assignors to Mine Safety Appliances Company, Pittsburgh, Pa., a corporation of Pennsylvania Filed July 1, 1958, Ser. No. 745,892

3 Claims. (Cl. 154—110)

This invention relates to safety helmets, such as are worn by industrial workers, and more particularly to those in which the shells are made from laminations bonded together under heat and pressure.

The customary way of making non-metallic helmet shells is to laminate resin-impregnated layers of fabric-like material under heat and pressure in a mold having the shape of the desired shell. The resulting shells are rigid, and resistant to impact and penetration as well as to passage of electricity. Those used heretofore have been satisfactory for many purposes, but it is desirable to increase their impact and penetration resistance. That is the object of this invention and it is accomplished without increasing the number of laminations or altering the materials of which they are made.

In accordance with this invention, a greatly improved helmet shell is formed by placing in a mold cavity in the following order, a cotton fabric blank, a glass fabric disc, a screen blank containing wires, a cotton fabric disc, a cotton fabric blank, a mat of random glass fibers, a cotton fabric blank and a glass fabric ring. The blanks are substantially the size of the helmet shell, but the discs are much smaller and are disposed centrally of the blanks. The mat is large enough to cover at least the major area of the crown of the shell. The outer diameter of the ring is substantially the same as the outer diameter of the blanks. Before these elements are placed in the mold, all of them except the screen are impregnated with a suitable thermosetting resin. Therefore, when they are molded under heat and pressure the resin sets and bonds them together into a strong shell having the shape of a helmet. Such a shell makes maximum use of the desirable properties of the various materials used.

The preferred embodiment of the invention is illustrated in the accompanying drawings; in which Fig. 1 is a perspective view of a typical helmet shell formed by our method;

Fig. 2 is an exploded view, before laminating, of the various layers that will be molded together; and Fig. 3 is a vertical section through a mold containing the laminations, just before the mold is closed.

Referring to Fig. 1 of the drawings, a helmet shell is shown which has a crown 1 surrounded by an integral brim 2. This shell was molded under heat and pressure from a plurality of layers of certain sizes and materials, most of which were impregnated with a thermosetting resin. The various layers are shown in Fig. 2 in their pre-molded shape, and include three elliptical blanks 3, 4 and 5 made from woven cotton fabric. These blanks may be cut from a strip or sheet of cotton fabric which has been impregnated with a suitable thermosetting resin. Also cut from the same material is a circular disc 6 that is considerably smaller than the blanks. Another disc 7 of about the same size as the first disc, and a ring 8 that has an outer diameter substantially equal to that of the blanks, are cut from glass fabric woven from glass fibers and likewise impregnated with a thermosetting resin. A mat 9 is formed from glass fibers randomly arranged. The manner of making such mats is well known. It may be substantially the same size and shape as the fabric blanks, but preferably is a generally rectangular sheet narrower and a little shorter than the diameter of the blanks. The remaining layer of the stack consists of a blank 10 of about the same size and shape as the other blanks, but it is a screen that is not impregnated with any resin and therefore is pervious. This screen preferably is formed from cotton threads as well as wire woven together.

It is a feature of this invention that the various layers just mentioned are superimposed on one another in the order shown in Fig. 2. They may be stacked before they are placed in a mold or as that is done. In either case, the bottom layer, which will form the top of the helmet shell, is the cotton fabric blank 3. On the center of this is placed the glass fabric disc 7, followed by the screen 10. On the center of the screen the cotton fabric disc 6 is placed, and this is covered by the cotton fabric blank 4. The next layer is the glass mat 9, on which the third cotton fabric blank 5 is laid. On top of the latter there is the glass fabric ring 8. The mat is disposed so that it will extend over the crown of the finished shell from front to back of it, where strength and reinforcement are needed most. It need not extend into the brim or far enough down the sides of the crown to meet the brim. As stated before, all of these layers except the screen are impregnated with a thermosetting resin. After these elements have been stacked in the mold cavity, the mold 12 is closed as heat and pressure are applied to it to compress the material therein and simultaneously laminate the layers together with the resin, which is set or cured by the heat. After a thin shell has been formed in this manner it is removed from the mold and trimmed where necessary.

It has been found that by arranging the various layers of material in the order shown in the drawings, especially with the glass disc 7 and the screen 10 near the top layer of the shell instead of near its lower surface as has been the practice heretofore, an increase in impact and penetration resistance is obtained without increasing the weight of the shell. The same materials are used that have been used before, and the shell also consists of the same number of laminations. The principal difference is in the order of the laminations, yet the change produces new and unexpected results, because it could not be foreseen that a change in order would have any effect on the strength of the shell. Also, the rigidity of the shell is increased without an attendant loss in missile penetration resistance, which has normally followed an increase in rigidity heretofore. Furthermore, there is no loss of the smooth, hard, water resistant surface and good insulation properties that have been present in shells up to this time.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. The method of making a helmet shell, comprising impregnating cotton fabric, glass fabric and a mat of random glass fibers with thermosetting resin; cutting from the cotton fabric three blanks of substantially the size of the helmet, cutting from each of the cotton and glass fabrics a disc that is materially smaller than said blanks, cutting from the glass fabric a ring having substantially the same outer diameter as said blanks; placing a cotton fabric blank in a mold cavity followed by the glass fabric disc, a pervious screen of substantially the same size as said blanks and containing wire, the cotton fabric disc, another cotton fabric blank, the glass mat, the third cotton fabric blank and the glass fabric ring; and then applying heat and pressure to the layers of material in the mold to set the resin and bond them together into a strong laminate with the glass mat extending throughout at least the major area of the shell.

2. A helmet shell molded under heat and pressure from a plurality of layers of material, said layers comprising from top to bottom of the helmet; a cotton fabric blank, a glass fabric disc, a screen blank containing wires, a cotton fabric disc, a cotton fabric blank, a mat of random glass fibers, a cotton fabric blank and a glass fabric ring; said blanks being substantially the size of the shell; said mat being as large as at least the major area of the shell; said discs being materially smaller than the blanks and disposed substantially centrally thereof; said ring having substantially the same outer diameter as the blanks; and all of said layers except said screen containing a thermosetting resin impregnant before molding, whereby the layers in the molder shell are bonded together into a strong laminate.

3. A helmet shell according to claim 2, in which said glass mat has substantally parallel sides and extends from front to back of the crown of the shell.

References Cited in the file of this patent

UNITED STATES PATENTS

| | | |
|---|---|---|
| 2,312,227 | Yant | Feb. 23, 1943 |
| 2,420,522 | Daly | May 13, 1947 |
| 2,423,076 | Daly | July 1, 1947 |
| 2,746,049 | Hudson | May 22, 1956 |
| 2,766,453 | Frieder et al. | Oct. 16, 1956 |